(12) United States Patent
Seenivasan

(10) Patent No.: US 7,537,674 B1
(45) Date of Patent: May 26, 2009

(54) CLOSED FLOATATION DE-INKING MODULE FOR RECYCLED PAPER

(76) Inventor: Narayanasamy Seenivasan, 3828 Cochran Dr., Carrollton, TX (US) 75010

( * ) Notice: Subject to any disclaimer, the term of this patent is extended or adjusted under 35 U.S.C. 154(b) by 419 days.

(21) Appl. No.: 11/451,164

(22) Filed: Jun. 12, 2006

(51) Int. Cl.
*D21B 1/08* (2006.01)

(52) U.S. Cl. .................. 162/4; 162/5; 162/7; 162/60; 162/380; 209/164

(58) Field of Classification Search ............. 162/4, 162/5, 6, 7, 8, 60, 55, 380; 209/164, 170, 209/168
See application file for complete search history.

(56) References Cited

U.S. PATENT DOCUMENTS

| | | |
|---|---|---|
| 1,279,040 A | 9/1918 | Thomas |
| 2,793,185 A | 5/1957 | Albrektsson et al. |
| 3,043,433 A | 7/1962 | Singer |
| 3,098,784 A | 7/1963 | Gorman, Jr. |
| 3,354,028 A | 11/1967 | Illingworth et al. |
| 4,110,210 A | 8/1978 | Degner et al. |
| 4,157,952 A | 6/1979 | Krofta |
| 4,328,095 A | 5/1982 | Ortner et al. |
| 4,331,534 A | 5/1982 | Barnscheidt |
| 4,477,341 A | 10/1984 | Schweiss et al. |
| 4,560,474 A | 12/1985 | Holik |
| 4,639,313 A | 1/1987 | Zipperian |
| 4,726,897 A | 2/1988 | Schweiss et al. |
| 4,737,272 A | 4/1988 | Szatkowski et al. |
| 4,842,777 A | 6/1989 | Lamort |
| 5,242,585 A | 9/1993 | Krofta |
| 5,273,624 A | 12/1993 | Chamberlain et al. |
| 5,310,459 A | 5/1994 | Krofta |
| 5,437,784 A | 8/1995 | Meinecke et al. |
| 5,465,848 A | 11/1995 | Veh et al. |
| 5,529,190 A | 6/1996 | Carlton et al. |
| 5,624,609 A | 4/1997 | Serres et al. |
| 5,762,781 A | 6/1998 | Bodnaras |
| 6,082,549 A | 7/2000 | Gommel et al. |
| 6,197,153 B1 | 3/2001 | Serres |
| 6,585,854 B2 | 7/2003 | Scherzinger et al. |
| 6,881,297 B2 | 4/2005 | Scherzinger et al. |
| 6,959,815 B2 | 11/2005 | Xu et al. |

FOREIGN PATENT DOCUMENTS

| | | |
|---|---|---|
| GB | 2.017.780 | 10/1979 |
| GB | 2.130.920 | 6/1984 |
| GB | 2.144.729 | 3/1985 |
| WO | WO8803838 | 6/1988 |

OTHER PUBLICATIONS

Vijayakumar Venugapal, Deinking Process for Recycling Mixed Waste Paper, Pennsylvania State University, Mar. 1997.*

* cited by examiner

*Primary Examiner*—Mark Halpern
(74) *Attorney, Agent, or Firm*—Michael I Kroll

(57) ABSTRACT

Disclosed is a closed floatation conventional de-inking process adopted in the recycled paper processing plants, in which, ink separation and removal constitutes a major task. The specific concerns of this invention are the concept and the equipment for the separation and removal of the ink and ash from the pulp slurry contaminated with ink, clay and stickies.

6 Claims, 11 Drawing Sheets

CLOSED FLOATATION DE-INKING MODULE FOR RECYCLED PAPER

BACKGROUND OF THE INVENTION

1. Field of the Invention

The present invention relates generally to a de-inking process and more specifically, to a closed floatation conventional de-inking process adopted in the recycled paper processing plants, in which, ink separation and removal constitutes a major task. The specific concerns of this invention are the concept and the equipment for the separation and removal of the ink and ash from the pulp slurry contaminated with ink, clay and stickies.

Waste paper, usually called by the public, is actually not a waste and a very valuable source of fiber for recycled paper mills. Recovery of fiber has been increasing due to the solid waste problem and the demand by industry as well. There are several kinds of recovered paper, such as old corrugated container, old news print, white grades with several sub categories. The old corrugated container is usually recycled with out any ink removal to produce brown grade paper and boards.

A majority of the old newsprint and other white grade paper are recycled into various valuable paper categories using the de-inking process. There are two types of de-inking called: washing and flotation. Flotation usually has a washing step in the subsequent steps and can be called a combination process. The washing de-inking without any ink purging using some kind of white water clarification is not true de-inking as the ink recycles in the system. It is less common to have washing as the sole de-inking process at present. The washing process does not help in handling large ink and other dirt particles whereas the flotation process separates and removes a wide range of particles including small particles.

Several types of chemistries are used in the de-inking process like hardness dependent calcium soap froth, hardness independent surfactant, enzymatic and so forth. All these chemistries help release the ink from the fiber and attach the ink particles to the air bubbles in a selective adsorption process. The process needs equipment to mechanically separate and remove the ink off the pulp suspension. This is commonly called a flotation cell in the de-inking mills.

A de-inking mill usually has re-pulping equipment called a pulper at the beginning of the process to repulp the recovered paper brought into the mill for recycling. The re-pulping is done with water and chemicals to aid the pulping and sometimes bleaching at the same time. De-inking agent is usually added in the pulper and gets well dispersed with the pulp. The ink release from the fiber is aided by the de-inking agent with the wetting of the fiber surface as well as swelling. The same surfactant helps in the froth flotation in the primary de-inking system for the formation of the foam and selective adsorption of the ink particles onto the air bubbles.

For the effective separation of the ink from the pulp suspension, the air bubbles should be formed mechanically inside the pulp suspension which raise to the surface on which the ink particles adsorb to float to the surface.

A flotation cell is very important in bringing air and dispersing the air to increase the collision frequency with the ink particles along with other unwanted hydrophobic materials. The higher the bubble-ink collision frequency the better the chances of ink attachment to the foam. Attaching as much ink as possible under given operating conditions flotation cells remove the foam using several techniques like overflow, scraping using paddles, pressure under enclosed vessel and so forth. Thus de-inking is accomplished in various ways within froth flotation technology.

The closed floatation conventional de-inking process for recycled paper of the present invention is used to separate the ink, clay, stickies and pulp fines from the recycled pulp slurry. The contaminated pulp slurry is injected into the flotation cell and the foam generated is drawn out of the cell by the vacuum produced by the injector using a separator.

A shower is used in the separator to flush the slurry down on a periodic basis. A moisture trap is used after the separator to trap any moisture in the air before recycling the air back in the injector.

The air flow control system comprising a safety valve is used to add extra air from the atmosphere in case of loss of air. A flow meter is used to measure the flow of air drawn by the injector. An exhaust line off the moisture trap connected to the flow meter recycles the air preventing the humidity build up in the plant.

The reject from the separators is drained into the effluent stream and the accept from the flotation cell is sent to the downstream process.

2. Description of the Prior Art

There are other processes for de-inking pulp. Typical of these is U.S. Pat. No. 3,098,784 issued to Gorman, Jr. on Jul. 23, 1963.

Another patent was issued to Illingworth, et al. on Nov. 21, 1967 as U.S. Pat. No. 3,354,028. Yet another U.S. Pat. No. 4,328,095 was issued to Ortner, et al. on May 4, 1982 and still yet another was issued on May 25, 1982 to Bamscheidt as U.S. Pat. No. 4,331,534.

Another patent was issued to Krofta on Sep. 7, 1993 as U.S. Pat. No. 5,242,585. Yet another U.S. Pat. No. 5,310,459 was issued to Krofta on May 10, 1994. Still yet another U.S. Pat. No. 5,273,624 was issued on Dec. 28, 1993 to Chamberlain, et al Another was issued to Serres on Mar. 6, 2001 as U.S. Pat. No. 6,197,153 and another U.K Patent No. GB2017780 to Ortner, et al. on Oct. 10, 1979.

U.S. Pat. No. 3,098,784

Inventor: William S. Gorman, Jr.

Issued: Jul. 23, 1963

The object of this invention is to provide a de-inking process involving only the addition of a single additional material into a slurry in a standard de-fibering, step under certain controlled conditions followed by usual thickening and washing steps. It is a further object of the invention to provide such a simplified process that will produce an improved fiber and resultant paper which brings brightness and other general characteristics is superior even to processes employing new fiber stock.

U.S. Pat. No. 3,354,028

Inventor: Robert H. Illingworth, et al.

Issued: Nov. 21, 1967

The object of this invention is to provide chemical methods and means for clarifying the aqueous effluents of waste newspaper de-inking plants. Another object of this invention is to provide methods and means whereby the water requirements of a waste paper de-inking plant can be continuously recycled. Still another object of this invention is to reduce the sewage problems ordinarily connected with waste paper de-inking plants.

U.S. Pat. No. 4,328,095

Inventor: Herbert Ortner, et al.

Issued: May 4, 1982

Apparatus is provided for reprocessing old paper in a series of flotation cells arranged one behind another, the suspension discharge 11 from the front cell being connected to the suspension inlet 8 of the following cell, each cell being provided with a stirring impeller 3, an air infeed device 9 and a foam outlet opening 12. The cells are provided by a substantially tubular body 1 which is horizontal or slopes gradually downward towards the rear, the tubular body being divided into a plurality of sections by partition walls 2 extending substantially vertically. Each section is provided with a suspension inlet 8, a suspension discharge outlet 11, a foam outlet opening 12, a stirring impeller 3, and an air infeed device 9.

U.S. Pat. No. 4,331,534

Inventor: Wolfgang Bamscheidt

Issued: May 25, 1982

A pulp suspension of waste paper which is laden with air bubbles is introduced into a flotation cell. Fine air bubbles rise through the pulp suspension toward the top. Printing ink and other impurities are deposited on the bubbles which form a foam layer on the surface of the pulp suspension. The foam which is laden with impurities is drawn off from the surface. The fibers which have been subjected to preliminary purification in this manner sink downwardly. For reducing the number of cells connected in series to fewer than a third, while obtaining the same degree of whiteness, the fibers which were subjected to preliminary purification are drawn off and are once again supplied to the flotation cell in the form of an air-laden pulp suspension. Alternatively, instead of the air-laden pulp suspension, a water-air suspension can be injected. The air bubbles which are thus introduced rise toward the top and traverse the sinking fibers in a counterflow. As a result, an intensive air-pulp contact is created.

U.S. Pat. No. 5,242,585

Inventor: Milos Krofta

Issued: Sep. 7, 1993

An apparatus and method for de-inking waste paper pulp using a foam flotation process to recycle printed waste paper for the manufacture of new paper. Pulped printed paper is fed as a slurry to an inlet of a shallow tank. Internal guide walls in the tank establish a flow path from the inlet to an outlet. The walls are sized and positioned to create a generally uniform cross-sectional flow area. A plurality of modules are disposed along the flow path. Each module includes at least one injector that aerates the flow and an extractor that removes floated ink foam. A portion of the flow from each module is recycled to an upstream module, preferably by a conduit and associated pump. In a preferred form, an injector (or injectors) alone located at the inlet is fed by the next downstream module and an extractor alone is located near the outlet. The invention also includes a main recycling loop from the downstream end of the flow path to the upstream end. This main recycling loop has a large flow rate compared to the recycled flow between the modules.

U.S. Pat. No. 5,273,624

Inventor: Jeffrey L. Chamberlain, et al.

Issued: Dec. 28, 1993

A method and several embodiments of apparatus are disclosed for use in foam flotation separation. The method discloses performing the separation in a module operated at non-atmospheric pressure, and the apparatus disclosed are suitable for use as the module of the method. Both the method and the apparatus contemplate positive and negative pressure operation.

U.S. Pat. No. 5,310,459

Inventor: Milos Krofta

Issued: May 10, 1994

An apparatus and method for de-inking waste paper pulp using a foam flotation process to recycle printed waste paper for the manufacture of new paper. Pulped printed paper is fed as a slurry to an inlet of a shallow tank. Internal guide walls in the tank establish a flow path from the inlet to an outlet. The walls are sized and positioned to create a generally uniform cross-sectional flow area. A plurality of modules are disposed along the flow path. Each module includes at least one injector that aerates the flow and an extractor that removes floated ink foam. A portion of the flow from each module is recycled to an upstream module, preferably by a conduit and associated pump. In a preferred form, an injector (or injectors) alone located at the inlet is fed by the next downstream module and an extractor alone is located near the outlet. The invention also includes a main recycling loop from the downstream end of the flow path to the upstream end. This main recycling loop has a large flow rate compared to the recycled flow between the modules.

U.S. Pat. No. 6,197,153

Inventor: Alain Serres

Issued: Mar. 6, 2001

The method for de-inking paper pulp produced by the reduction to pulp, with water, of old papers of various qualities according to which a stream of air bubbles (C) is sent through the flow ($E.sub.2$, $S.sub.2$, $E.sub.3$, $S.sub.3$) of pulp at least once, is characterized by the fact that a countercurrent of water ($E.sub.1$) is sent into the stream of de-inking air bubbles after said bubbles have passed through the pulp and become laden with ink particles so that the countercurrent releases the particles (fibers, fines, fillers) borne along by these de-inking bubbles and carries them away.

U.K. Patent Number GB2017780

Inventor: Herbert Ortner, et al.

Issued: Oct. 10, 1979

Waste paper is recovered by coarse pulping in a pulper, preliminary sorting, thickening to stock densities of more than 10%, treatment in a reaction tower in the presence of de-inking chemicals followed by thinning of the suspension and flotation in a flotation appliance. The invention is characterized in that at least some of the de-inking chemicals are introduced in the pulper, and in that the water laden with particles of printing ink which is yielded during the thickening process before the reaction tower is subjected to flotation in a subsidiary circuit flotation appliance clean water obtained from this appliance being reintroduced into the process. As a further development, the froth arising from the flotation appliance is introduced into the subsidiary circuit flotation appliance for after-treatment.

While these processes may be suitable for the purposes for which they were designed, they would not be as suitable for the purposes of the present invention, as hereinafter described.

SUMMARY OF THE PRESENT INVENTION

A primary object of the present invention is to provide a compact and efficient flotation cell for the ink removal from the pulp slurry by means of internal vacuum created by the injector system.

Another object of the present invention is to provide a flotation cell for ink removal from the pulp slurry that minimizes the floor space for the de-inking equipment.

Yet another object of the present invention is to provide a flotation cell system that accepts pulp with minimum or no air from the flotation cell to be sent to the down stream cleaners.

Still yet another object of the present invention is to provide a flotation cell system that minimizes the fiber loss and maximizes the ink and ash removal efficiency.

Another object of the present invention is to provide a flotation cell system that results in getting brighter pulp in a one or two step process.

Yet another object of the present invention is to provide a flotation cell system that minimizes the energy consumption similar to the several other conventional cells.

Still yet another object of the present invention is to provide a flotation cell system that eliminates the use of defoamer chemicals to handle the foam.

Another object of the present invention is to provide a flotation cell system that eliminates the need for showers for the foam and reduce the reject flow off the cells to the effluent treatment.

Additional objects of the present invention will appear as the description proceeds.

The present invention overcomes the shortcomings of the prior art by providing an injector assembly that forms means for gasifying a slurry by expanding the in-feed bore within the injector assembly having a source of ambient air in communication therewith whereby the negative pressure created draws air into the slurry prior to injection into a flotation cell whereupon the contaminants within the slurry combine with the air bubbles forming a foam at the surface of the flotation cell that is passively directed into a reject conduit leaving a decontaminated slurry, known as the accept, which is channeled therefrom for further processing.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
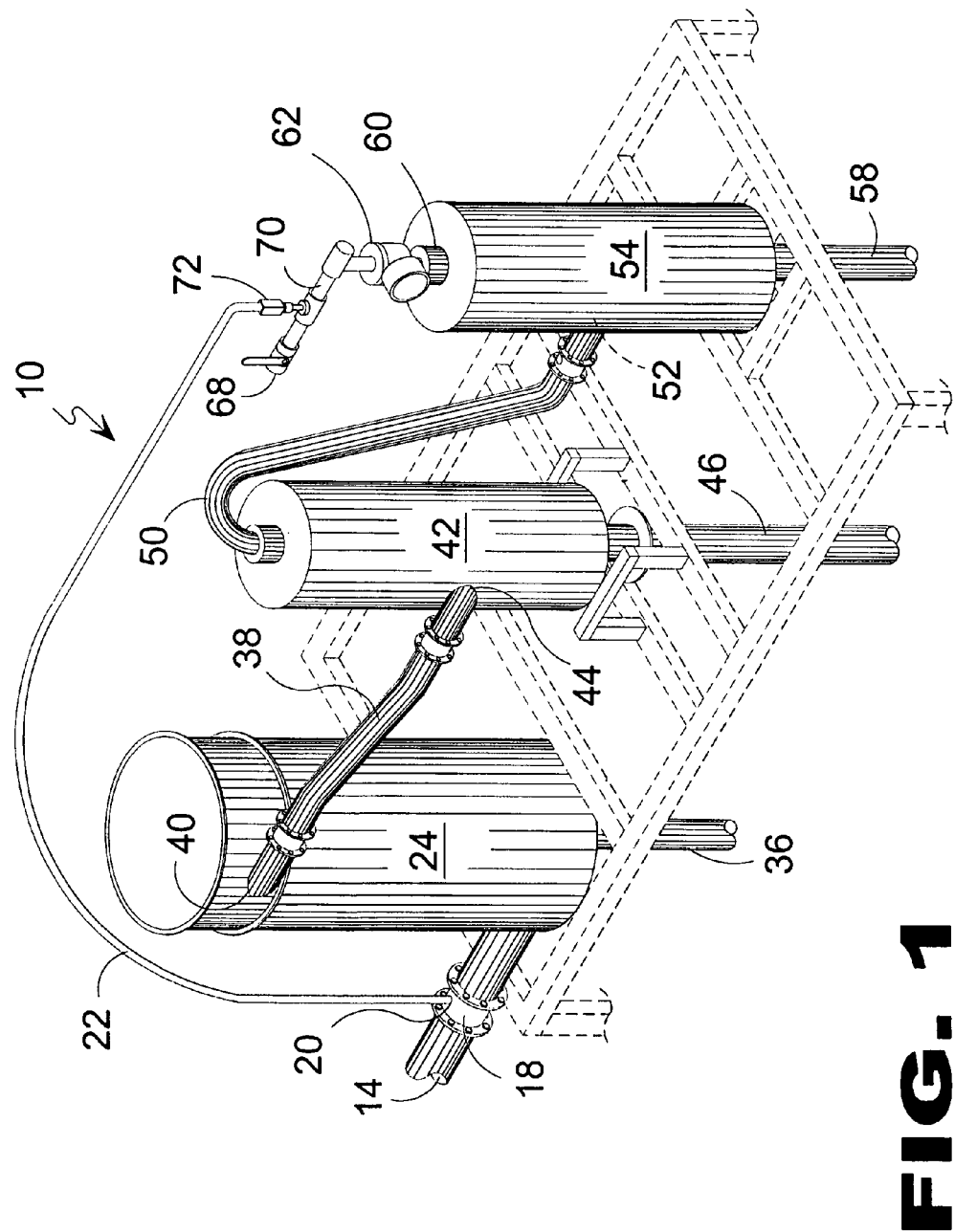
FIG. 1 is an illustrative view of the closed de-inking module of the present invention.

Turning now descriptively to the drawings, in which similar reference characters denote similar elements throughout the several views, the Figures illustrate the Closed Flotation De-inking Module for Recycled Paper of the present invention. With regard to the reference numerals used, the following numbering is used throughout the various drawing figures.

10 Closed Flotation De-inking Module for Recycled Paper
12 flotation cell feed tank
14 feed line
16 feed line flow control
18 injector
20 injector air intake port
22 air recirculation line
24 flotation cell
26 vacuum break
28 waterproof camera
30 sight glass
32 separator
34 accept port
36 accept line
38 reject line
40 reject port
42 sludge trap
44 intake port
46 drain
48 moisture vent
50 conduit
52 intake port
54 moisture trap
56 drain port 58 drain line
60 supply port
62 air flow control
64 reject tank
66 trap
68 valve
70 conduit
72 flow meter

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Referring to FIG. 1, shown is an illustrative view of the closed de-inking module of the present invention comprising a pulp slurry feed line 14 having an injector assembly interdisposed within the feed line providing a source of pulp slurry to the flotation cell 24 having an accept line 36 and flotation cell reject port 40 leading to reject line 38 terminating at sludge tank port 44. Sludge tank 42 has drain 46 and moisture vent 48 leading to conduit 50 terminating at moisture trap port 52. Moisture trap 54 has drain 58 and air return supply port 60. Supply port 60 forms a part of air control module 62 having vent 68 proving additional air as needed. air control module 62 incorporates conduit 70 and flow meter 72 connected via conduit to injector assembly air intake port 20. The closed de-inking module of the present invention is used to separate ink, clay, stickies and pulp fines from recycled pulp slurry. The contaminated pulp slurry is injected into the flotation cell 24 and the foam generated is drawn out of the cell by vacuum produced by the injector 18 using a separator. A shower is used in the separator to flush the slurry down on a periodic basis. A sludge trap 42 and moisture trap 54 are used after the separator to trap any moisture in the air before recycling the air back to the injector 18. A safety valve 68 is used to add extra air from the atmosphere in case of loss of air. The reject from the separators is drained 46, 58 into the effluent stream and the accept 36 from the flotation cell is sent to the down stream process.

Figure 2:
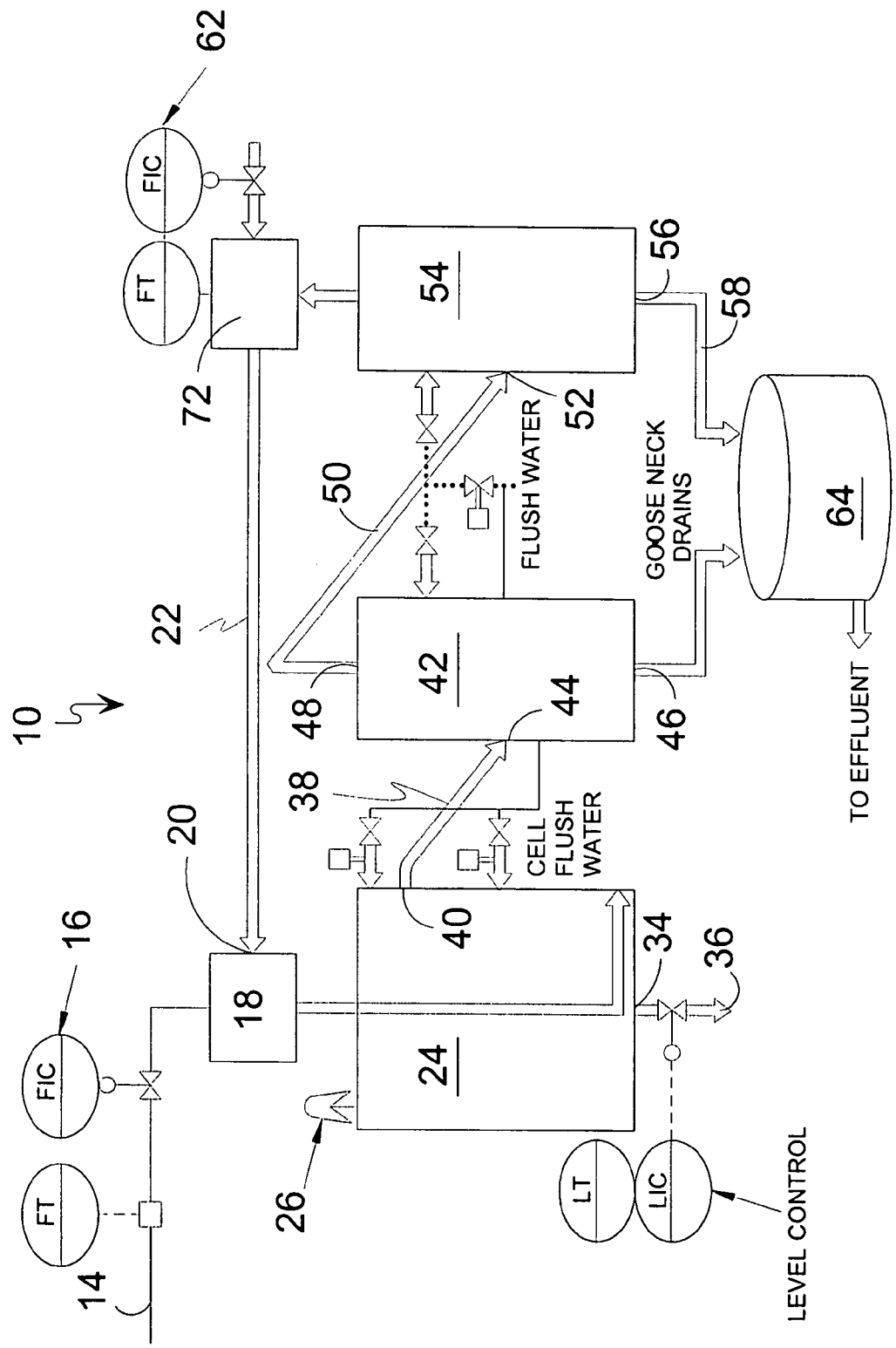
FIG. 2 is a flow chart of the closed de-inking module of the present invention.

Referring to FIG. 2, shown is a flow chart of the closed de-inking module of the present invention. illustrated is the operation of the closed de-inking module 10 depicting a closed flotation cell 24 in communication with a sludge trap 42 and moisture trap 54 whereby the air is recycled through the injector assembly 18 entraining air into the pulp slurry prior to injection into the closed flotation cell. As aforementioned, the pulp slurry source feed line 14 and feed line flow control 16 provides flotation cell 24 with pulp slurry. Flotation cell 24 can incorporate vacuum break 26 and/or waterproof camera 28 and/or sight glass 30. Flotation cell feed line 14 has injector assembly 18 interdisposed therein providing a source of pulp slurry to flotation cell 24 having accept port 34 and accept line 36 with foam separator 32 feeding reject port 40 contaminated foam slurry traveling via reject line 38 to sludge tank 42 at sludge tank port 44. Sludge tank 42 has drain 46 leading to reject tank 64 and moisture vent 48 leading to conduit 50 terminating at moisture trap port 52. Moisture trap 54 has drain 58 leading to reject tank 64 with both drains 46, 58 incorporating a trap to maintain vacuum within the system. Moisture trap supply port 60 forms a part of air control module 62 having vent 68 proving additional air as needed. air control module 22 incorporates conduit 70 and flow meter 72 connected via conduit 22 to injector assembly air intake port 20 completing the closed system that recirculates the air within the system 10.

Figure 3:
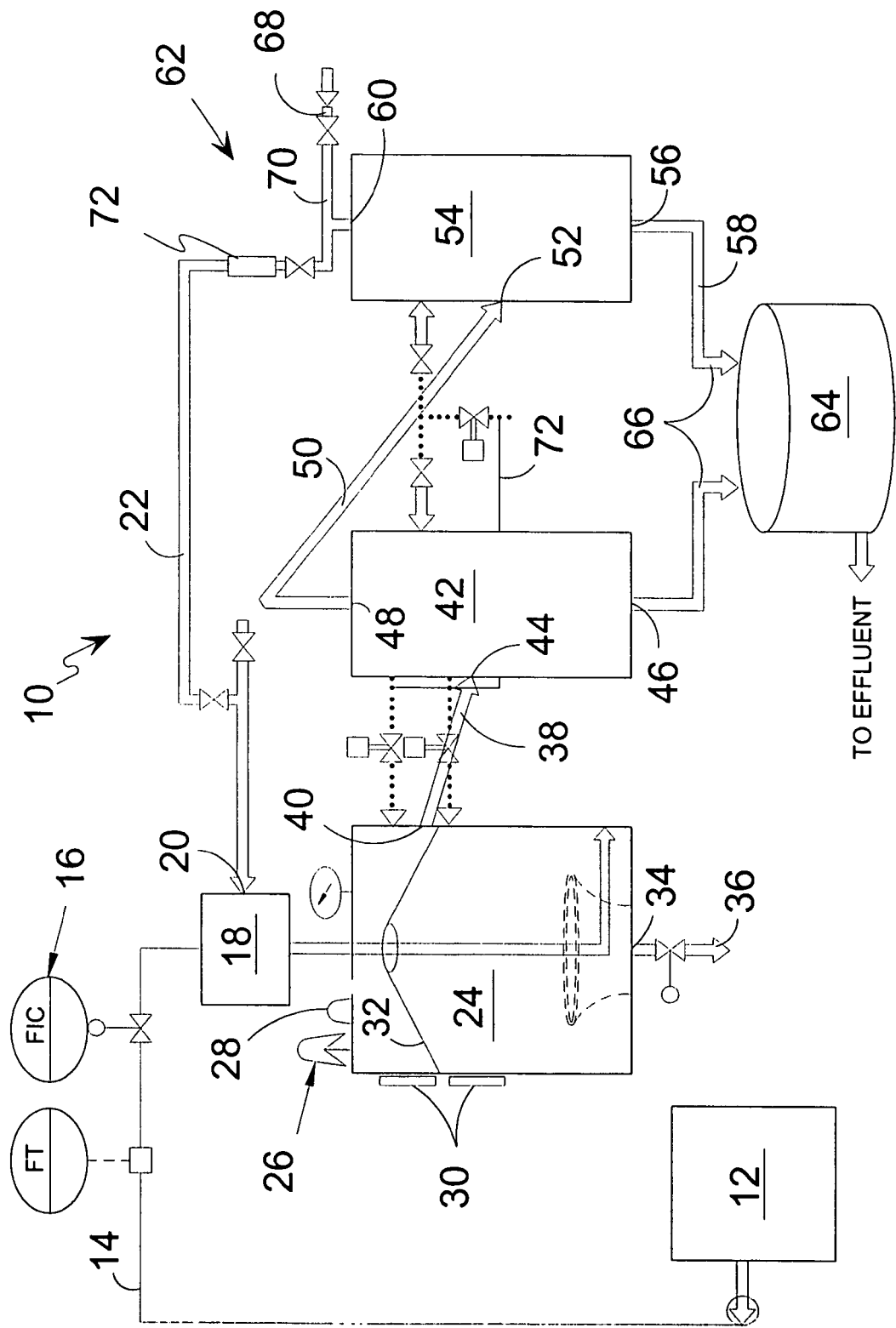
FIG. 3 is a flow chart of the closed de-inking module of the present invention.

Referring to FIG. 3, shown is a flow chart of the closed de-inking module of the present invention. As aforementioned, the pulp slurry source 12 has feed line 14 and feed line flow control 16 that provides flotation cell 24 with pulp slurry. Flotation cell 24 can incorporate vacuum break 26 and/or waterproof camera 28 and/or sight glass 30. Flotation cell feed line 14 has injector assembly 18 interdisposed therein providing a source of pulp slurry to flotation cell 24 having accept port 34 and accept line 36 with foam separator 32 feeding reject port 40 contaminated foam slurry traveling via reject line 38 to sludge tank 42 at sludge tank port 44. Sludge tank 42 has drain 46 leading to reject tank 64 and moisture vent 48 leading to conduit 50 terminating at moisture trap port 52. Moisture trap 54 has drain 58 leading to reject tank 64 with both drains 46, 58 incorporating trap 66 to maintain vacuum within the system. Moisture trap supply port 60 forms a part of air control module 62 having vent 68 proving additional air as needed. air control module 22 incorporates conduit 70 and flow meter 72 connected via conduit 22 to injector assembly air intake port 20 completing the closed system that recirculates the air within the system 10.

Figure 4:
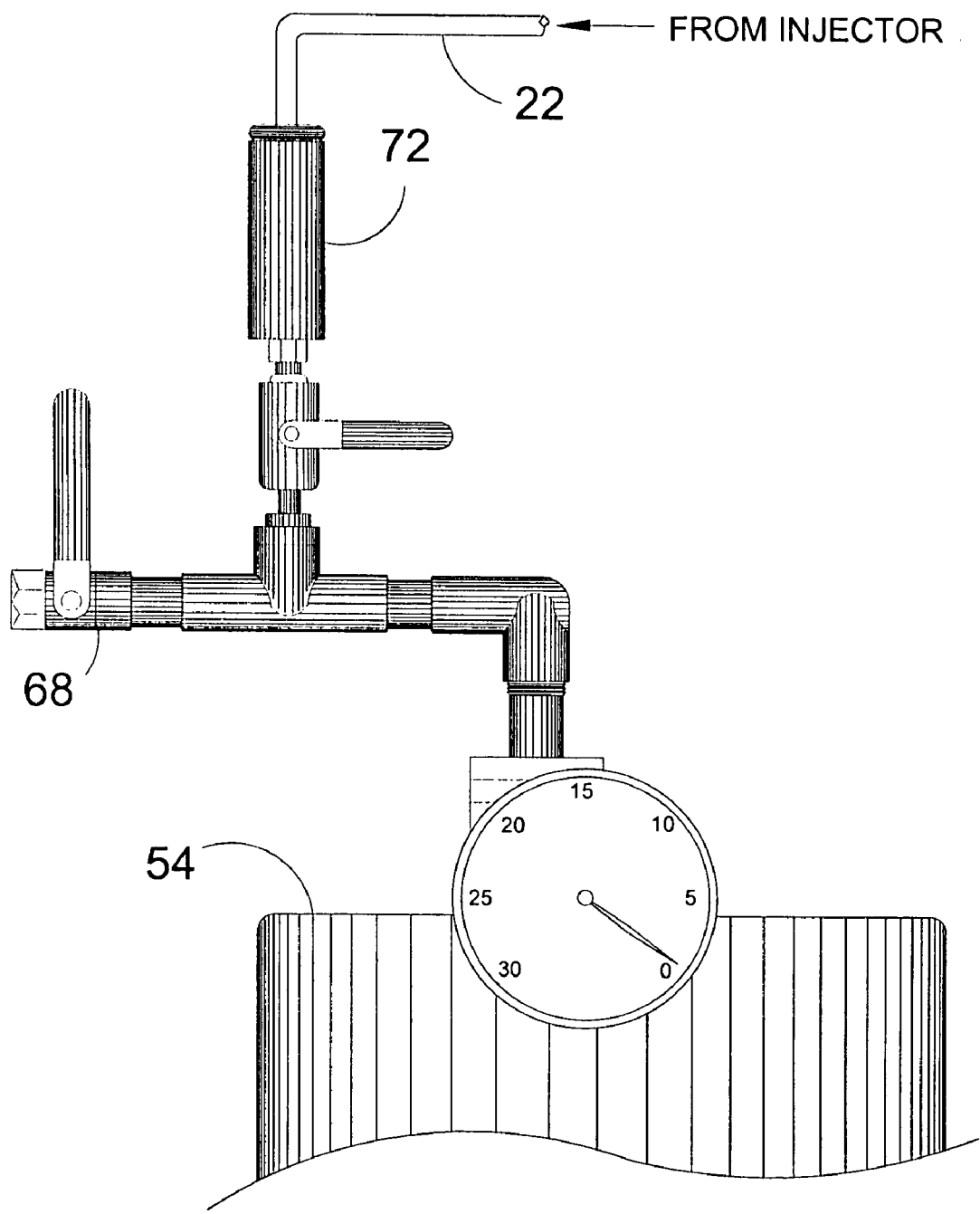
FIG. 4 is a frontal view of the module air flow meter and valve of the present invention.

Referring to FIG. 4, shown is a frontal view of the module air flow meter and valve of the present invention. Shown is the air flow control system 62 comprising a safety valve 68 used to add extra air from the atmosphere in case of loss of air. Flow meter 72 is used to measure the flow of air drawn through 22 by the injector.

Figure 5:
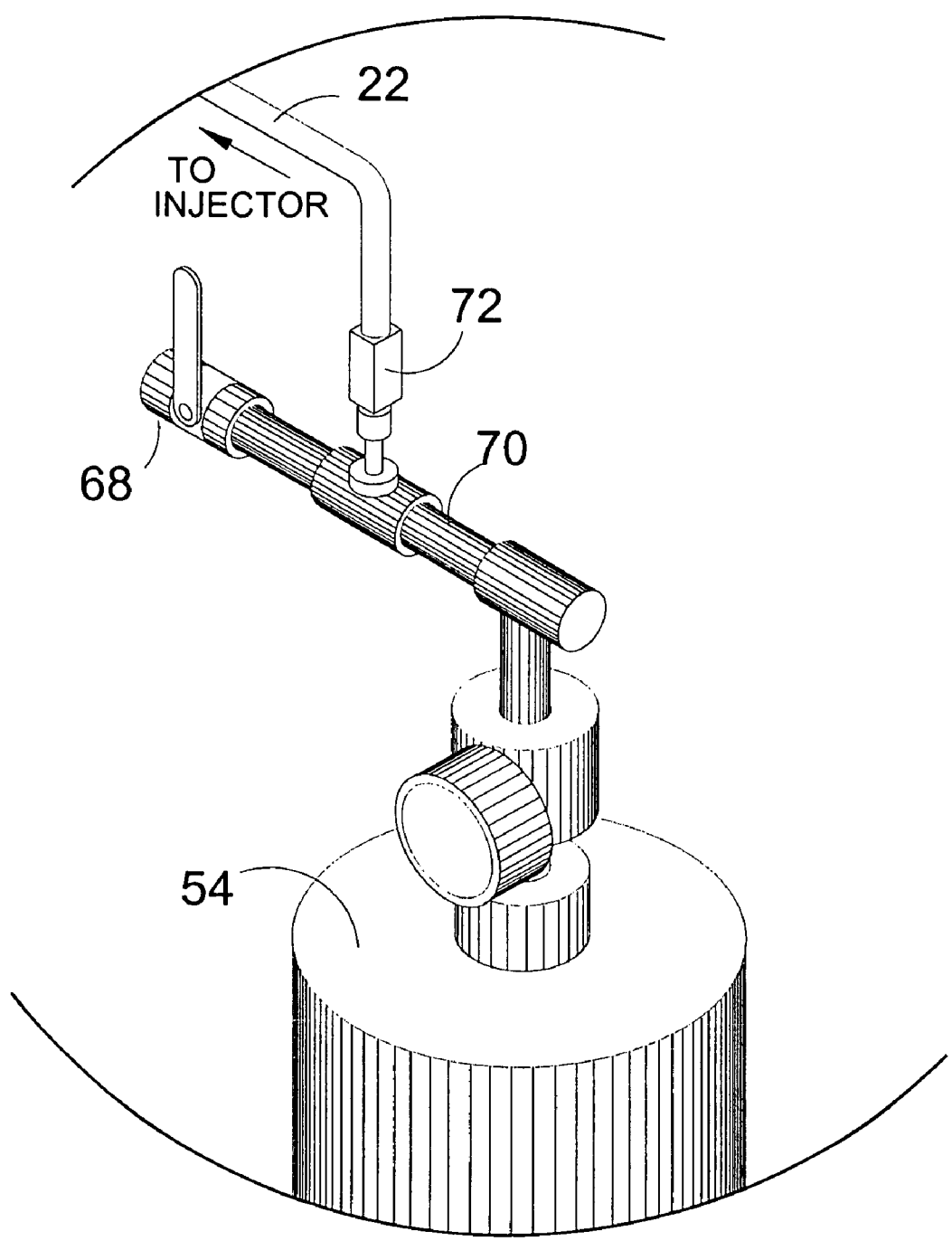
FIG. 5 is a detailed perspective view of the module air flow meter and valve of the present invention.

Referring to FIG. 5, shown is a detailed perspective view of the module air flow meter and valve of the present invention. Shown is the air flow control system 62 comprising a safety 68 used to add extra air from the atmosphere in case of loss of air. A flow meter 72 is used to measure the flow of air drawn by the injector. An exhaust line off the moisture trap connected to the flow meter recycles the air preventing the humidity build up in the plant.

Figure 6:
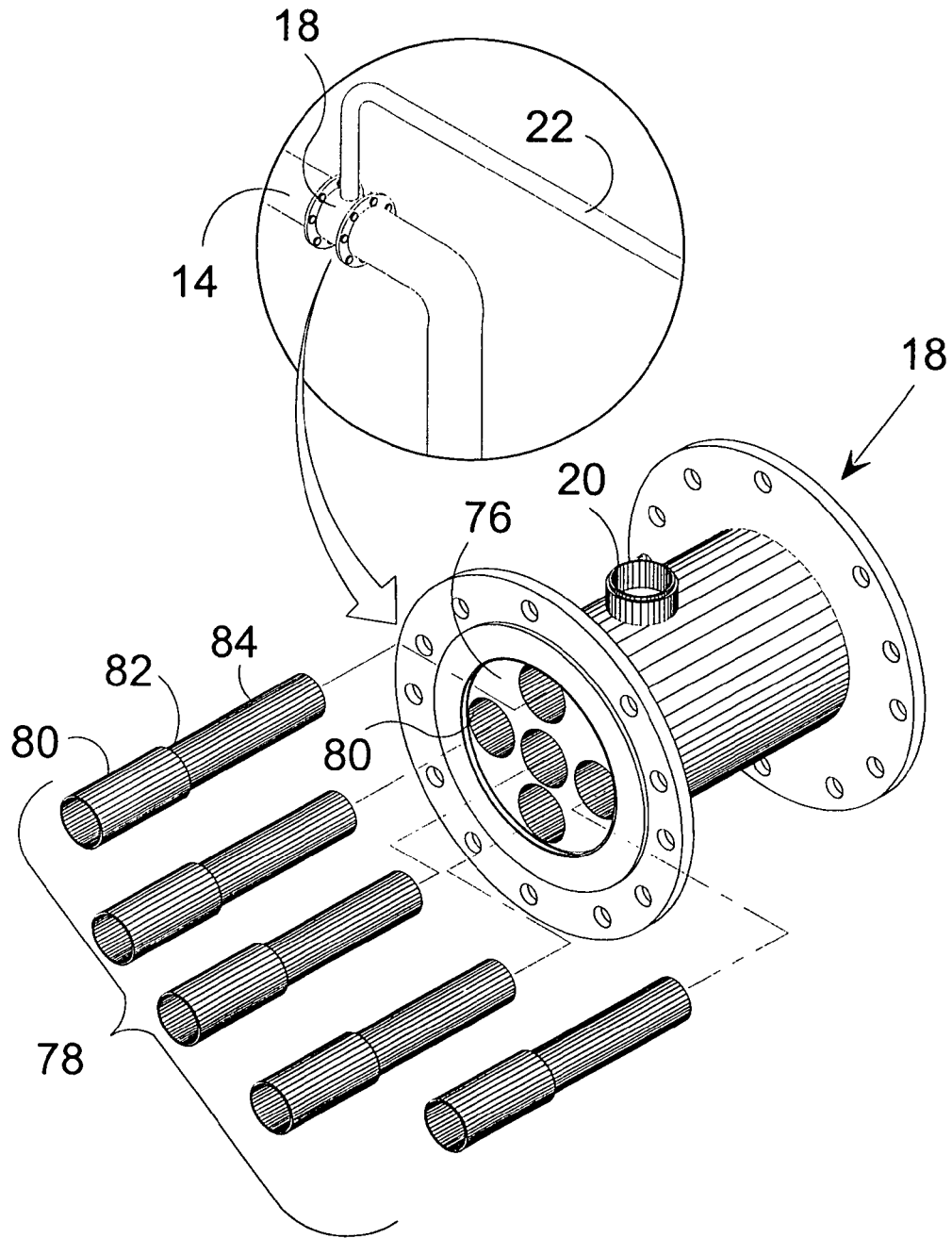
FIG. 6 is an exploded view of the injectors from the injector assembly.

Referring to FIG. 6, shown is an exploded view of the injectors from the injector assembly. The injector 78 forms means for gasifying a slurry by expanding the infeed bore 80 within the injector assembly 18 having a nozzle air intake 20 as a source of ambient air in communication therewith whereby the negative pressure created draws air at 82 into the slurry prior to injection through egress nozzle 84 into a slurry feed line 14 on into the flotation cell whereupon the contaminants within the slurry combine with the air bubbles forming a foam at the surface inside of the cell that is passively directed into a reject compartment leaving a decontaminated slurry, known as the accept, which is channeled therefrom through the accept line for further processing.

Figure 7:
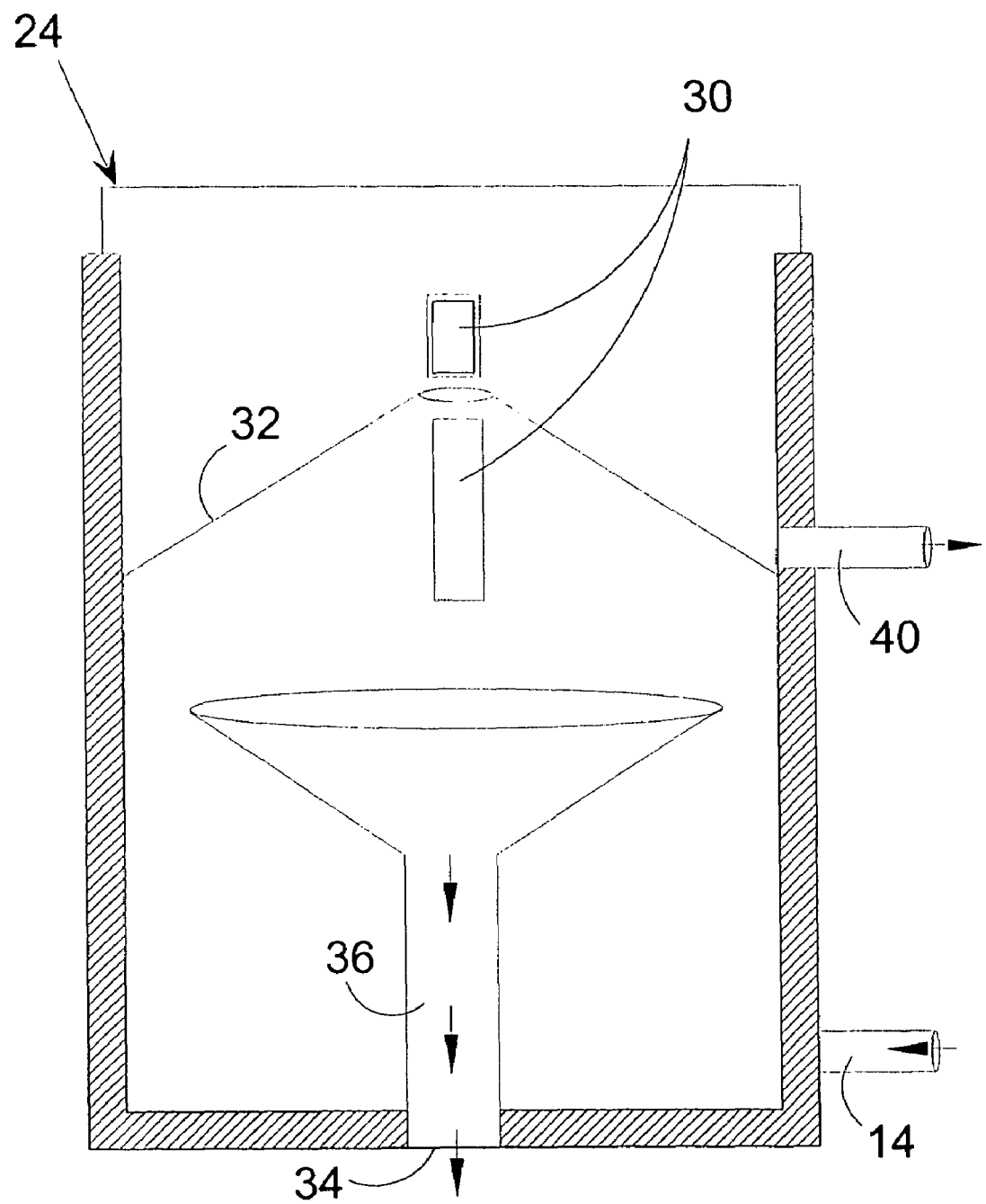
FIG. 7 is a sectional view of the closed flotation cell chamber of the present invention.

Referring to FIG. 7, shown is a sectional view of the closed flotation cell chamber of the present invention. Contaminated pulp slurry is injected into the flotation cell 24 and the foam generated is drawn out of the cell by vacuum produced by the injector using a separator 32. A shower is used in the separator to flush the slurry down on a periodic basis. A moisture trap is used after the separator to trap any moisture in the air before recycling the air back in the injector. A safety valve is used to add extra air from the atmosphere in case of loss of air. The reject from the separators is drained into the effluent stream and the accept from the flotation cell is sent to the down stream process.

Figure 8:
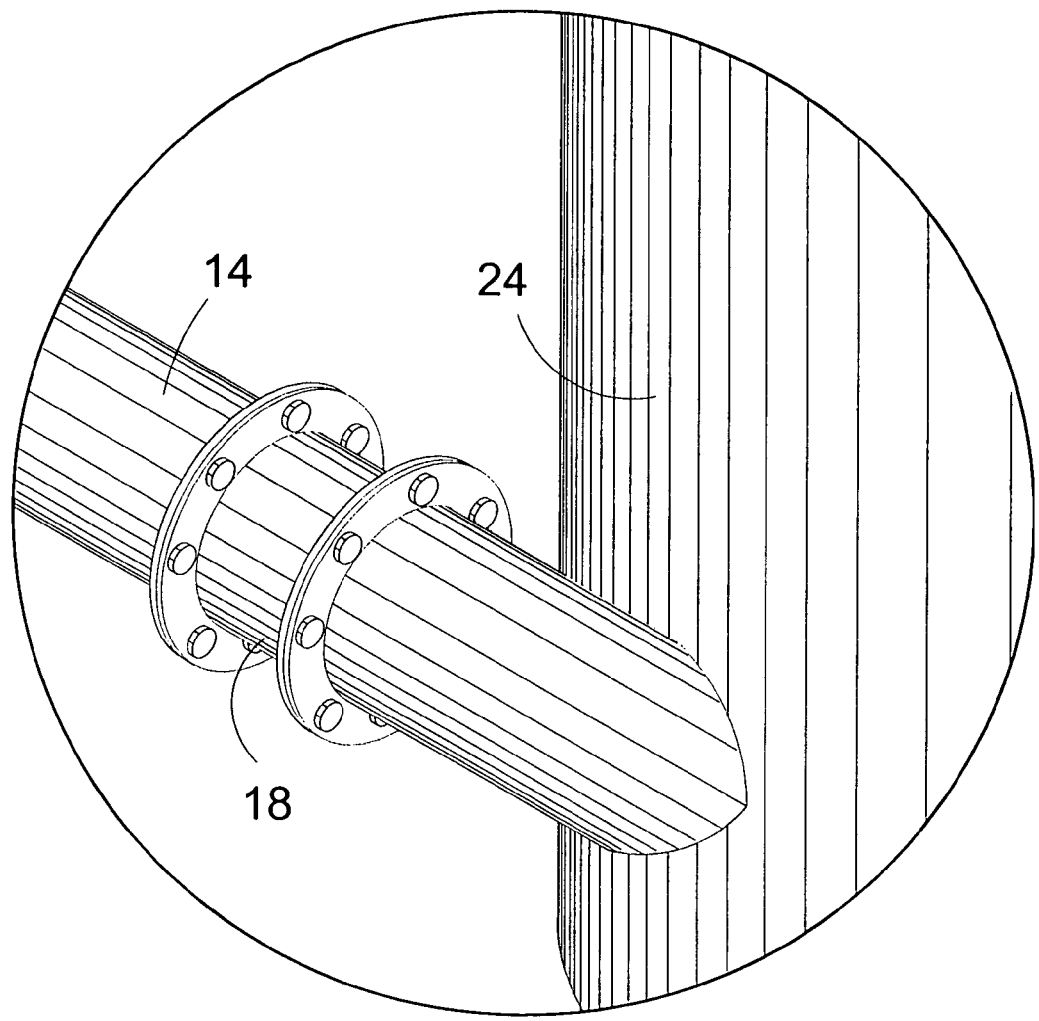
FIG. 8 is a detail view of the pulp feed line connected to the closed flotation cell of the present invention.

Referring to FIG. 8, shown is a detail view of the pulp feed line connected to the closed flotation cell of the present invention. The flotation de-inking module comprises a vertical cylindrical body called the flotation cell 24 having a tangential inlet at the bottom to feed the contaminated pulp slurry.

Figure 9:
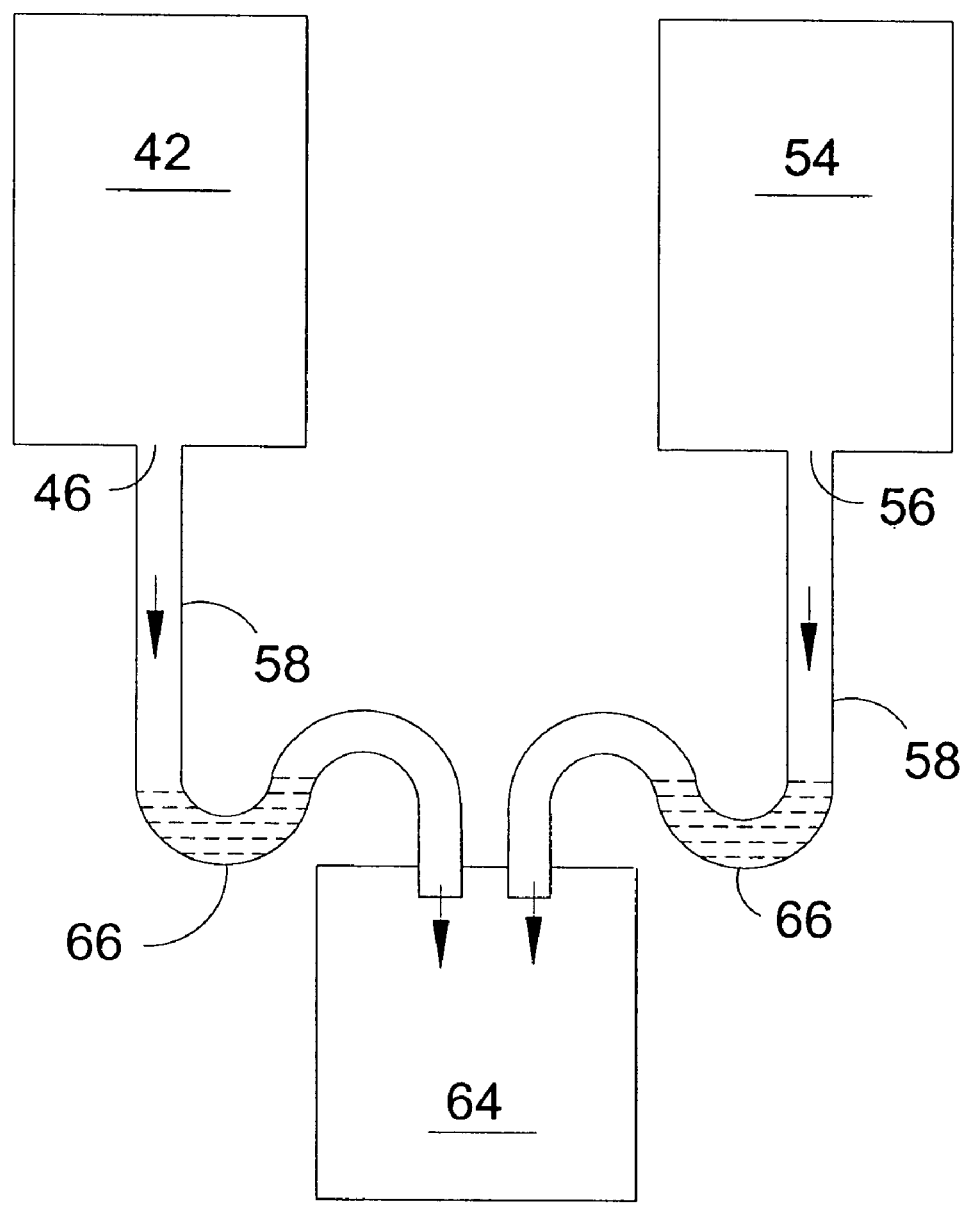
FIG. 9 is a view of the separator drain system of the closed de-inking module of the present invention.

Referring to FIG. 9, shown is a view of the separator drain system of the closed de-inking module of the present invention. Contaminated pulp slurry is injected into the flotation cell and the foam generated is drawn out of the cell by vacuum produced by the injector using a separator. A shower is used in the separator to flush the slurry down on a periodic basis. A moisture trap is used after the separator to trap any moisture in the air before recycling the air back in the injector. A safety valve is used to add extra air from the atmosphere in case of loss of air. The reject from the sludge trap 42 and moisture trap 54 is drained via 46, 56 respectively through drains 58 into reject tank 64. Drains 58 incorporate traps 66 to maintain vacuum within the system.

Figure 10:
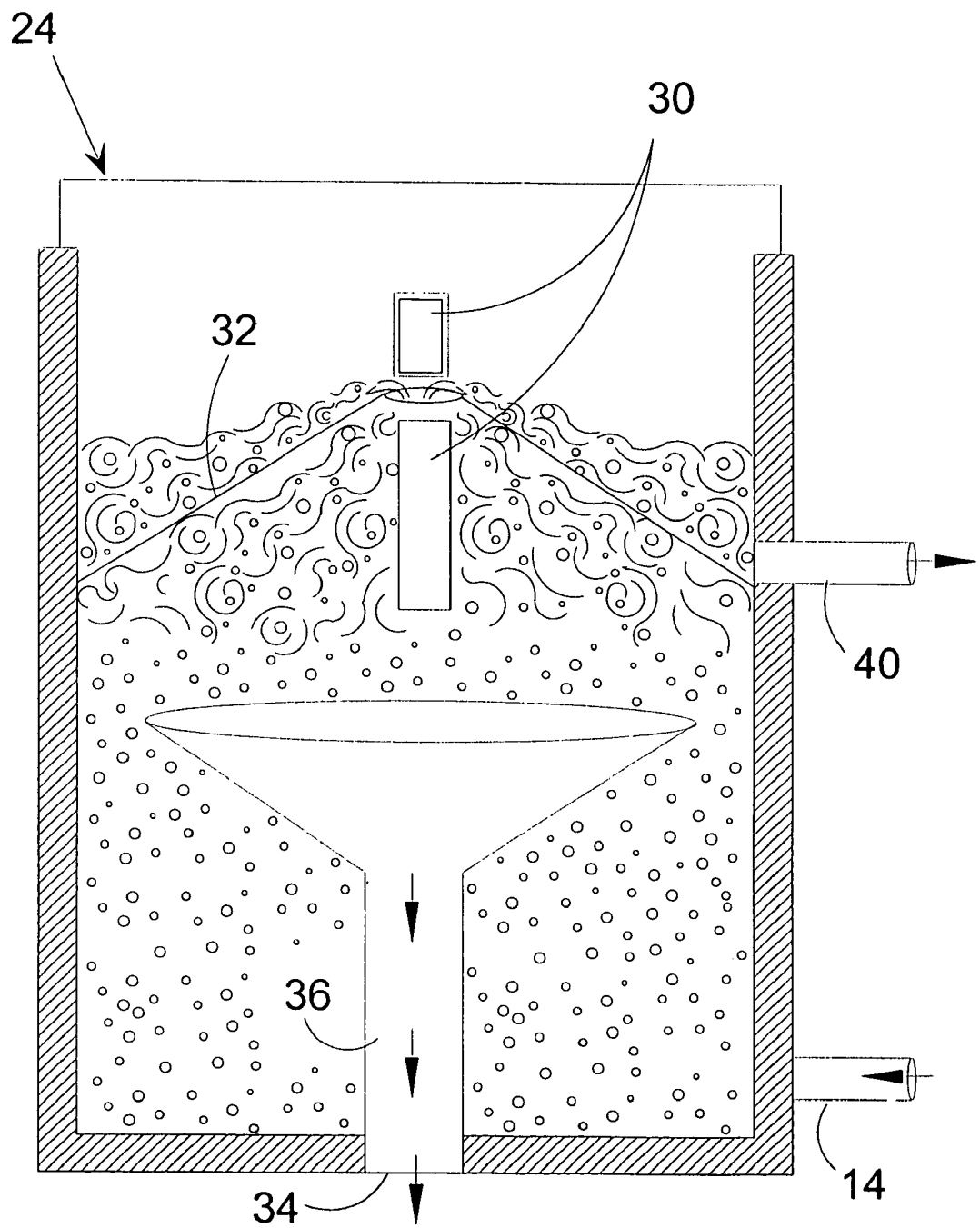
FIG. 10 is a view of the foam separation details of the closed flotation cell of the present invention.

Referring to FIG. 10, shown is a view of the foam separation details of the closed flotation cell of the present invention. Contaminated pulp slurry is injected into the flotation cell 24 and the foam generated is drawn out of the cell by vacuum produced by the injector using a separator 32. A shower is used in the separator to flush the slurry down on a periodic basis. A moisture trap is used after the separator to trap any moisture in the air before recycling the air back in the injector. A safety valve is used to add extra air from the atmosphere in case of loss of air. The reject from the sludge tank and moisture trap are drained into the effluent stream and the accept from the flotation cell is sent to the down stream process.

Figure 11:
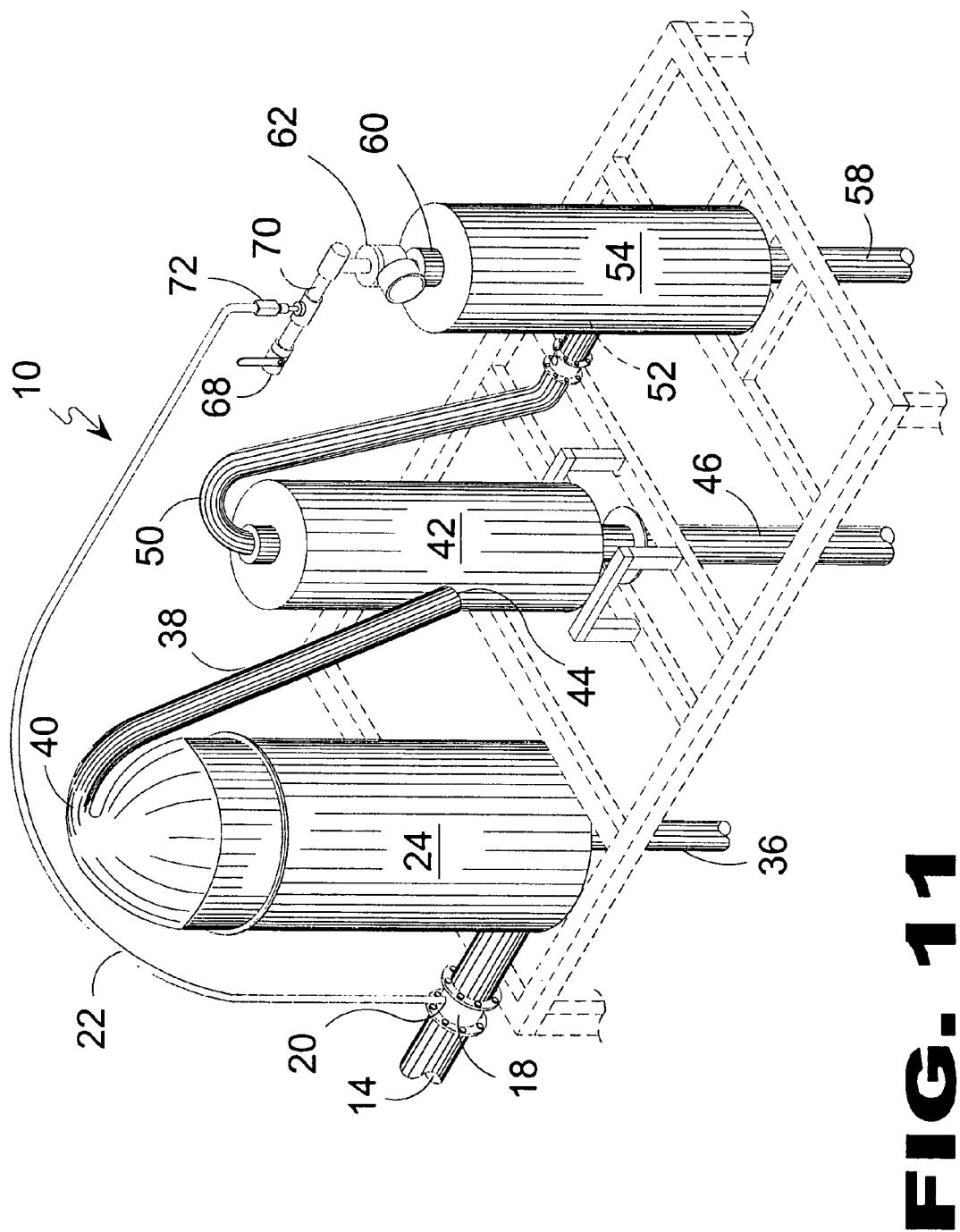
FIG. 11 is an illustrative view of the closed de-inking module of the present invention.

Referring to FIG. 11, shown is an illustrative view of alternate receptacle shapes of the closed de-inking module of the present invention comprising a pulp slurry feed line 14 having an injector assembly interdisposed within the feed line providing a source of pulp slurry to the flotation cell 24 having an accept line 36 and flotation cell reject port 40 leading to reject line 38 terminating at sludge tank port 44. Sludge tank 42 has drain 46 and moisture vent 48 leading to conduit 50 terminating at moisture trap port 52. Moisture trap 54 has drain 58 and air return supply port 60. Supply port 60 forms a part of air control module 62 having vent 68 proving additional air as needed. air control module 62 incorporates conduit 70 and flow meter 72 connected via conduit to injector assembly air intake port 20. The closed de-inking module of the present invention is used to separate ink, clay, stickies and pulp fines from recycled pulp slurry. The contaminated pulp slurry is injected into the flotation cell 24 and the foam generated is drawn out of the cell by vacuum produced by the injector 18 using a separator. A shower is used in the separator to flush the slurry down on a periodic basis. A sludge trap 42 and moisture trap 54 are used after the separator to trap any moisture in the air before recycling the air back to the injector 18. A safety valve 68 is used to add extra air from the atmosphere in case of loss of air. The reject from the separators is drained 46, 58 into the effluent stream and the accept 36 from the flotation cell is sent to the down stream process.

What is claimed is new and desired to be protected by Letters Patent is set forth in the appended claims:

1. A closed system for pulp de-inking process for recycled paper comprising:
   a) a closed flotation cell in conduit communication with a source of pulp slurry having an injector assembly interdisposed within a pulp slurry feed line for injecting air into said pulp slurry, said flotation cell containing a foam separator, said flotation cell functioning without the use of defoamer chemicals;
   b) a sludge tank in conduit communication with the flotation cell for receiving contaminated foam slurry through a reject port located above said foam separator;
   c) a moisture trap in conduit communication with the sludge tank for receiving moisture from a vent located at a top of said sludge tank;
   d) a reject tank connected through drains to bottoms of the sludge tank and moisture trap, said moisture trap incorporating a trap to maintain vacuum within said system; and
   e) an air-flow control system having a conduit providing communication between the moisture trap and the injector assembly for recirculating air from said moisture trap back to said injector assembly.

2. The closed de-inking system as recited in claim 1, wherein said flotation cell has a valved accept line for drawing off accepted pulp slurry through said foam separator.

3. The closed de-inking system as recited in claim 2, wherein said flotation cell, sludge trap and moisture trap are cylindrical.

4. The closed de-inking system as recited in claim 3, wherein said injector assembly includes at least one nozzle for accelerating the pulp slurry prior to injection into the flotation cell.

5. The closed de-inking system as recited in claim 4, wherein said injector assembly passively draws air from the air-flow control system to infuse micro air bubbles into the pulp slurry to optimize a process of separating ink, clay, stickies and other float able contaminants from the recycled pulp slurry.

6. The closed de-inking system as recited in claim 5, wherein said air-flow control system includes a safety valve to add extra air from the atmosphere in case of loss of air.

\* \* \* \* \*